3,073,667
SHAPED ARTICLES COMPRISING ISOTACTIC POLYPROPYLENE HAVING A SURFACE FORMED OF A GRAFT COPOLYMER, AND METHOD OF MAKING THE ARTICLES
Alberto Bonvicini, Anito Monaci, and Vittorio Cappuccio, Terni, Italy, assignors to Montecatini, societa generale per l'Industria Mineraria e Chimica, Milan, Italy
No Drawing. Filed Nov. 25, 1957, Ser. No. 698,334
Claims priority, application Italy Nov. 26, 1956
12 Claims. (Cl. 8—115.5)

This invention relates to shaped articles comprising modified isotactic polypropylene, and to process for producing them.

Recently G. Natta and his coworkers disclosed (e.g., in two papers entitled, respectively, "A New Class of Alpha-Olefin Polymers Having Exceptional Uniformity of Structure," and "The Crystalline Structure of a New Type of Polypropylene," presented at an open meeting of Accademia Nazionale Dei Lincei on December 11, 1954, and published in the Proceedings of the Accademia on January 29, 1955), new polymers of the alpha-olefins $CH_2=CHR$, where R is a hydrocarbon radical. Thus, they disclosed two different kinds of polymers of the same alpha-olefins, one of said polymers being made up of crystallizable macromolecules having substantially a stereo-regular structure which Natta called the isotactic structure and another of said polymers being made up of amorphous non-crystallizable, non-isotactic macromolecules which Natta called "atactic" macromolecules.

Isotactic polymers are, according to Natta et al., normally solid homopolymers made up of linear, head-to-tail macromolecules having substantially the isotactic structure characterized in that substantially all of the asymmetric tertiary main chain carbon atoms of adjacent monomeric units have, on the same chain, the same steric configuration and the main chain of the macromolecules, when presumed to be fully extended in a hypothetical plane, shows substantially all of the R groups attached to the tertiary asymmetric carbon atoms of adjacent monomeric units making up a given section of the chain on one side of the plane, e.g., above the plane, and all of the hydrogen atoms bound to said tertiary carbon atoms on the opposite side of the plane, e.g., below the plane. A section of the main chain in which the R groups attached to the tertiary carbon atoms lie above the hypothetical plane, and the H atoms attached to those tertiary carbon atoms lie below the plane, may be followed by a section of the chain in which the R atoms attached to the tertiary asymmetric carbon atoms lie below the plane and the H atoms attached to those tertiary asymmetric carbon atoms lie above the plane. As a result of their orderly steric structure, the isotactic macromolecules are highly crystallizable and exhibit a high percentage of crystallinity at the X-rays under normal conditions.

The atactic polymers are also normally solid, but are made up of linear, regular head-to-tail macromolecules in which tertiary asymmetric carbon atoms of the main chain having the same steric configuration have substantially a random distribution. When the main chain of the macromolecules of the atactic polymers is presumed to be fully extended in a hypothetical plane, it shows the R groups and the hydrogen atoms bound to the tertiary carbon atoms substantially in random distribution on the two sides of the plane. The atactic polymers, being of disorderly steric structure, are amorphous and non-crystallizable.

As Natta et al. have shown, the two types of polymers generally occur in admixture in the polymerizate obtained by polymerizing the alpha-olefine with the aid of certain catalysts prepared from compounds of transition metals of groups IV–VI of the periodic table and metal alkyls, and can be separated by selective solvents on the basis of their different steric structures. Natta et al. have also shown that the polymerization of the alpha-olefine can be oriented, by selection of the catalyst, to the production of polymer consisting predominantly of isotactic macromolecules, or polymers consisting predominantly of atactic macromolecules.

Highly isotactic polypropylene has many important advantages for the production of shaped articles. However, since the polymer does not absorb water, articles comprising it are not generally readily dyeable under conventional conditions using aqueous dye baths.

One object of this invention is to modify shaped articles highly isotactic polypropylene whereby the articles acquire an affinity for the wool acid dyes and can be dyed therewith to intense, fast shades.

Another object is to provide a method for modifying the dyeing characteristics of the shaped isotactic polypropylene articles.

These and other objects are accomplished by the present invention in accordance with which polymerizable nitrogen-containing vinyl monomers are graft-polymerized onto the surface of articles comprising the polypropylene and which have been peroxidized, the oxygen serving to initiate the "free radical" polymerization of the vinyl monomer.

The shaped articles of the highly isotactic and crystalline polypropylene can be peroxidized in any suitable way. For example, the articles, such as sheets, filaments, yarns and fabrics, can be treated with an oxygen-containing gaseous mixture, for example air, at a temperature between 50° C. and 120° C. Instead of air, mixtures of nitrogen in air, or air enriched in oxygen can be used.

The isotactic polypropylene is substantially impermeable to gases, so that when the articles formed therefrom are peroxidized as described, the peroxidation takes place predominantly on the surface of the article. Peroxidation of the article in air at 50–120° C., preferably 60–90° C., results in relatively high concentration of peroxide groups on the polypropylene chains at the surface of the article, without any substantial change in the mechanical properties of the polypropylene, or in the average molecular weight thereof.

The surface peroxidation can be carried out at atmospheric pressure, or more rapidly, under somewhat higher pressures, for instance under a pressure of 3 to 4 atmospheres.

In general, for grafting polymeric chains of the nitrogen-containing vinyl monomers onto the surface of the peroxidized articles, it is sufficient to subject the article to peroxidizing conditions until the amount of oxygen taken up in the form of peroxide (—O—O—) groups is such that its weight is increased by a few hundredth of a gram for each 100 grams of the sheet weight. The mechanical properties of the articles thus obtained differ to only a slight extent from the properties prior to the peroxidation. At the same time, such small amounts of active oxygen are more than sufficient to initiate the "free radical mechanism" polymerization of the nitrogen-containing vinyl monomers. When the peroxidized article is contacted with the polymerizable nitrogen-containing vinyl monomer, the latter is polymerized and the polymeric chains thus formed are for the most part grafted onto (i.e. chemically bound to) the surface of the article comprising the propylene polymer.

The peroxidic oxygen is taken as being in the form of hydroperoxide groups. When the analytical determination is made iodometrically the percentage of peroxidic oxygen is calculated by multiplying the amount of iodine set free by 100 parts of peroxidized polymer by the ratio $O_2/I_2 = 0.125$.

In practice, in preferred embodiments, the amount of peroxidic oxygen fixed on the shaped article of the polypropylene ranges from 0.01 to 1.0 g. per 100 g. of polypropylene. The amount varies according to the type of article treated and its volume-surface ratio. In general, amounts of peroxidic oxygen ranging from 0.01 to 0.1 g.m.$^2$ are sufficient.

The nitrogen-containing vinyl monomers the polymeric chains of which are grafted onto the peroxidized polypropylene article are vinyl monomers which contain at least one reactive basic group in the molecule. The monomers may be defined as vinyl-substituted heterocyclic secondary or tertiary amines and their nuclearly alkylated derivatives in which the alkyl groups contain from 1 to 4 carbon atoms. The monomers which can be used include the vinyl pyridines, vinyl piperidines, vinyl pyrazolines, vinyl quinolines, vinyl carbazoles, vinyl pyrrolidones, and their nuclearly alkylated derivatives.

The graft polymerization of the nitrogenous vinyl monomer onto the peroxidized article can be carried out using the monomer in the vapor or liquid phase, or in solution in a suitable solvent. The monomer may be used alone or, in some cases, it may be mixed with another monomer copolymerizable therewith, such as acrylonitrile, alkyl acrylates, alkyl methacrylates, etc., copolymeric chains containing units derived from each of the two monomers being grafted onto the surface of the polypropylene article.

After the graft polymerization has been effected, the articles are washed carefully with solvents which remove small amounts of non-polymerized monomer, and any non-grafted homopolymer of the vinyl monomer. The articles are then dried, and can be dyed, especially with the wool acid dyes for which nitrogen has a strong affinity, and finished.

While the dye receptivity of the isotactic polypropylene is modified by the polymeric or copolymeric chains grafted thereon, which provide sites for the dye absorption, other characteristics of the shaped articles, and particularly the mechanical characteristics, are not altered appreciably, as compared to those of articles of the polypropylene per se. Yarns treated in accordance with the invention are stronger and fluffier than those of the unmodified polypropylene.

The following examples are given to illustrate specific embodiments of the invention, it being understood that these examples are not intended as limiting.

*Example 1*

A yarn of a highly isotactic crystalline propylene polymer, peroxidized to a 0.3% content of peroxidic oxygen, is suspended in a reaction vessel kept under a pressure of 9 mm. mercury, heated up to 80–85° C. and saturated with 4-vinylpyridine vapors.

The duration of the grafting reaction is of 2½ hours. After this treatment, the yarn is carefully washed with an acetone-benzene mixture and then dried. The amount of vinylpyridine grafted onto the yarn in the form of polyvinylpyridine and determined by the difference in weight, is 10.6% on the original weight of the article. The yarn obtained shows the following serimetrical characteristics:

Tenacity _____ 5.5 g./den.
Elongation _____ 25%.

The yarn is dyed with acid dyes for wool, operating at the boiling temperature for 1½ hours, with 3% of dye according to the usual methods. The dyed yarn is rinsed and dried. With solid Follone Red B, i.e., a mixture of C.I. 22,245—Milling Fast Red G, C.I. Acid Red 85—vol. 1, page 2128; C.I. 23,285—Milling Fast Red R, C.I. Acid Red 99—vol. 1, page 1135; Alizarine Blue ACF, C.I. 62,055—Acid Blue 25, vol. II, page 1240; and solid light Yellow G, C. I. 18,820—Acid Yellow 11, vol. II, page 1008, colors having a good intensity are obtained.

*Example 2*

A yarn obtained from a highly isotactic crystalline propylene polymer is peroxidized up to a 0.25% content of peroxidic oxygen and is then introduced into a reaction vessel containing a mixture of equal proportions of benzene and 2-vinyl-quinoline, heated up to 85° C. and kept under nitrogen.

The duration of the grafting is 6 hours. After such a treatment the yarn is carefully washed with an acetone-benzene mixture and then dried. The amount of vinyl-quinoline grafted on the yarn as the homopolymer, polyvinylquinoline, and determined by weight difference, is 8%. The yarn shows the following serimetrical characteristics:

Tenacity _____ 5.2 g./den.
Elongation _____ 26%.

The yarn is dyed with acid dyes for wool, operating at the boiling temperature for 1½ hours with 5% dye, according to the usual methods. The dyed yarn is rinsed and dried. With solid Follone Red B, i.e., a mixture of C.I. 22,245—Milling Fast Red G, C.I. Acid Red 85—vol. 1, page 2128; C.I. 23,285—Milling Fast Red R, C.I. Acid Red 99—vol. 1, page 1135; Alizarine Blue ACF, C.I. 62,055—Acid Blue 25, vol. II, page 1240; and Alizarincyanide Green CHN, C.I. 61,570—Acid Green 25, colors with a good intensity are obtained.

*Example 3*

A yarn obtained from a highly isotactic, crystalline propylene polymer is peroxidized up to a 0.35% content of peroxidic oxygen and then suspended in a reaction vessel kept under a pressure of 5 mm. mercury, heated up to 83° and saturated with vinyl pyrrolidone vapors.

The duration of the grafting is 5 hours. After such treatment, the yarn is carefully washed with an acetone-benzene mixture and then dried. The amount of vinyl pyrrolidone grafted onto the yarn as polyvinyl pyrrolidone, and determined by weight difference, is 7.5%. The yarn shows the following serimetrical characteristics:

Tenacity _____ 5.1 g./den.
Elongation _____ 26%.

The yarn is dyed with acid dyes for wool, operated at the boiling temperature for 1½ hours with 3% dye, according to the usual methods.

The dyed yarn is rinsed and dried. With solid Follone Red B, i.e., a mixture of C.I. 22,245—Milling Fast Red G, C.I. Acid Red 85, vol. 1, page 2128; C.I. 23,285—Milling Fast Red R, C.I. Acid Red 99—vol. 1, page 1135; Roracyl Violet 2R indicated on page 4420, vol. IV, as Du Pont dyes for acrylonitrile; solid light Yellow G, C.I. 18,820—Acid Yellow 11, vol. II, page 1008, colors with good intensity are obtained.

*Example 4*

A yarn obtained from a highly isotactic, crystalline propylene high polymer, peroxidized up to a 0.12% content of peroxidic oxygen, is introduced into a vessel kept under a pressure of 5 mm. mercury. The vessel is then saturated with 2-methyl-5-vinylpyridine vapors and heated up to 80–85° C.

After 3 hours of this treatment the yarn is withdrawn from the reaction vessel, carefully washed with an acetone-benzene mixture and dried. The amount of the vinylpyridine grafted onto the yarn as poly(2-methyl-5-vinylpyridine) is 7.2%. The yarn shows the following serimetrical characteristics:

Tenacity _____ 5 g./den.
Elongation _____ 26.3%.

Colors having good intensity are obtained with the dyes of the preceding examples.

Example 5

A yarn obtained from a highly isotactic, crystalline propylene high polymer is peroxidized up to a 0.15% content of peroxidic oxygen and then introduced into a vessel kept under a pressure of 5 mm. mercury. The vessel is then saturated with 2-vinyl-5-ethyl-pyridine vapors and heated up to 85° C.

After a treatment lasting 8 hours the yarn is withdrawn from the reaction vessel, carefully washed with an acetone-benzene mixture and dried. The amount of the vinylpyridine grafted onto the yarn as poly(2-vinyl-5-ethyl-pyridine) is 4.5%.

The yarn shows the following serimetrical characteristics:

Tenacity _____ 5.2 g./den.
Elongation _____ 26%.

Colors of average intensity are obtained with the dyes of the preceding examples.

Example 6

A yarn obtained from a highly isotatic, crystalline propylene high polymer, is peroxidized up to a 0.47% peroxidic oxygen content and then introduced into a vessel containing a N-vinylcarbazole solution in cyclohexane and kept at 80° C. After 5 hours, the yarn is withdrawn from the reaction vessel, carefully washed with chloroform and dried. The amount of the vinylcarbazole grafted onto the yarn as poly(N-vinylcarbazole) is 10%. The yarn shows the following serimetrical characteristics:

Tenacity _____ 4.9 g./den.
Elongation _____ 27%.

Intense colors are obtained with the dyes of the preceding examples.

Example 7

A stretched film of a highly isotactic, crystalline propylene high polymer is peroxidized up to a 0.09% content of peroxidic oxygen and is then introduced into a vessel previously filled with 2-vinylpyridine.

After heating at a temperature of 75° C. for 5 hours, the film is withdrawn from the reaction vessel, washed with boiling acetone in order to remove the non-grafted poly-vinylpyridine and small amounts of physically adsorbed monomer, and then dried in an oven at 65° C.

The percent increase of weight is 3.1%. The thus treated film shows receptivity for wool acid dyes.

Example 8

A skein of highly isotactic, crystalline polypropylene yarn, peroxidized up to a 0.4% content of peroxidic oxygen, is introduced into an autoclave containing a 1:1 by weight mixture of acrylonitrile and 4-vinyl-pyridine. The whole is heated at 75° C. in vacuo for 4 hours. The thus treated yarn is then extracted with dimethylformamide and acetone at 50–60° C. for 1 hour.

A 8% proportion of a grafted copolymer of the acrylonitrile and 4-vinylpyridine is obtained. The yarn shows the following serimetrical characteristics:

Tenacity _____ 5.4 g./den.
Elongation _____ 25%.

Intense colors are obtained with the wool acid dyes.

Example 9

A skein of highly isotactic, crystalline polypropylene yarn is peroxidized up to a 0.4% oxygen content. Its serimetrical characteristics are the following:

Tenacity _____ 5.4 g./den.
Elongation _____ 25.5%.

The skein is now dipped into a solution containing equal proportions by weight of acrylonitrile and 2-vinyl-5-ethylpyridine and heated at 72° C. for 8 hours. The yarn obtained is washed with benzene and dimethylformamide in order to remove all the non-chemically bound polymers, and then dried and weighed. A weight increase, corresponding to 25% of the starting weight, is observed. The grafted yarn shows the following serimetrical characteristics:

Tenacity _____ 5.3 g./den.
Elongation _____ 29%.

The yarn is then dyed with acid dyes and shows a good dyeability; the colors applied are resistant to dry cleaning with trichloroethylene.

Various changes and modifications may be made in practicing the invention, without departing from the spirit thereof. Therefore, we intend to include in the scope of the appended claims all such variations in details as may be apparent to those skilled in the art.

What is claimed is:

1. A process for modifying the characteristics, particularly the dyeing characteristics, of permanently shaped articles formed of polypropylene which is predominantly crystalline isotactic polypropylene and having peroxidic oxygen in an amount of from 0.01 to 1.0 g./100 g. of the propylene chemically bound to the polypropylene chains at the surface of the article, which process comprises intimately contacting the article at a temperature of from about 72° C. to 85° C. with a polymerizable substance selected from the group consisting of nuclearly unsubstituted monovinyl pyridines, nuclear-alkyl substituted monovinyl pyridines, in which the alkyl groups contain from 1 to 4 carbon atoms, nuclearly unsubstituted monovinyl quinolines, N-vinyl carbazole, N-vinyl pyrrolidone, and mixtures of said monomers with another monomer copolymerizable therewith and selected from the group consisting of acrylonitrile, alkyl acrylates and alkyl methacrylates whereby graft polymerization of the polymerizable substance onto the polypropylene chains at the surface of the article is initiated by the peroxidic oxygen chemically bound to said chains, the modification of the article being confined substantially to the surface thereof.

2. The process according to claim 1, characterized in that the shaped article comprising the peroxidized isotactic polypropylene is contacted with vapors of the nitrogen-containing vinyl monomer.

3. The process according to claim 1, characterized in that the shaped article comprising the peroxidized isotactic polypropylene is contacted with the nitrogen-containing vinyl monomer in the liquid state.

4. The process according to claim 1, characterized in that the shaped article comprising the peroxidized isotactic polypropylene is contacted with a solution of the nitrogen-containing vinyl monomer in a hydrocarbon solvent.

5. Shaped articles of predominantly isotactic polypropylene having grafted thereon copolymeric chains of acrylonitrile and polymerizable vinyl monomer selected from the group consisting of nuclearly unsubstituted monovinyl pyridines, nuclear-alkyl substituted monovinyl pyridines, in which the alkyl groups contain from 1 to 4 carbon atoms, nuclearly unsubstituted monovinyl quinolines, N-vinyl carbazole, and N-vinyl pyrrolidone.

6. A permanently shaped article formed of polypropylene which is predominantly crystalline isotactic polypropylene and having grafted onto the polypropylene chains, substantially exclusively at the surface of the article, polymeric chains of a substance selected from the group consisting of nuclearly unsubstituted monovinyl pyridines, nuclear-alkyl substituted monovinyl pyridines, in which the alkyl groups contain from 1 to 4 carbon atoms, nuclearly unsubstituted monovinyl quinolines, N-vinyl carbazole, N-vinyl pyrrolidone, and mixtures of said monomers with another monomer copolymerizable therewith and selected from the group consisting of acrylonitrile, alkyl acrylates and alkyl methacrylates, said article having, at the surface thereof, increased receptivity for the acid wool type dyestuffs as compared to similar articles formed of the isotactic polypropylene per se but having mechanical properties substantially the same as those of similar articles formed of the isotactic polypropylene per se.

7. A shaped article according to claim 6, characterized in that poly (2-vinyl pyridine) is grafted onto the polypropylene chains at the surface of the article.

8. A shaped article according to claim 6, characterized in that poly (2-methyl-5-vinyl pyridine) is grafted onto the polypropylene chains at the surface of the article.

9. A shaped article according to claim 6, characterized in that poly (2-vinyl quinoline) is grafted onto the polypropylene chains at the surface of the article.

10. A shaped article according to claim 6, characterized in that a copolymer of acrylonitrile and 4-vinylpyridine is grafted onto the polypropylene chains at the surface of the article.

11. A shaped article according to claim 6, characterized in that a copolymer of acrylonitrile and 2-vinyl-5-ethylpyridine is grafted onto the polypropylene chains at the surface of the article.

12. A permanently shaped article according to claim 6, said article being dyed with an acid wool type dye.

References Cited in the file of this patent

UNITED STATES PATENTS

| | | |
|---|---|---|
| 2,643,990 | Ham | June 30, 1953 |
| 2,762,790 | Greene | Sept. 11, 1956 |
| 2,837,496 | Vandenberg | June 3, 1958 |
| 2,850,479 | Capps | Sept. 2, 1958 |

OTHER REFERENCES

Natta: Journal of Polymer Science, vol. XVI, pages 143–154, (1953).

Immergut et al.: Die Makromolekulare Chemie, Bd. XVIII/XIX, pages 322–341, March 1956.

UNITED STATES PATENT OFFICE
CERTIFICATE OF CORRECTION

Patent No. 3,073,667 January 15, 1963

Alberto Bonvicini et al.

It is hereby certified that error appears in the above numbered patent requiring correction and that the said Letters Patent should read as corrected below.

In the grant, line 1, and in the heading to the printed specification, line 6, for "Anito Monaci", each occurrence, read -- Avito Monaci --.

Signed and sealed this 26th day of November 1963.

(SEAL)
Attest:
ERNEST W. SWIDER

EDWIN L. REYNOLDS

Attesting Officer

Acting Commissioner of Patents